United States Patent
Cochran et al.

(10) Patent No.: US 7,220,378 B2
(45) Date of Patent: May 22, 2007

(54) METHOD AND APPARATUS FOR THE MEASUREMENT AND CONTROL OF BOTH THE INSIDE AND OUTSIDE SURFACE TEMPERATURE OF THERMOPLASTIC PREFORMS DURING STRETCH BLOW MOLDING OPERATIONS

(75) Inventors: Don W. Cochran, Novelty, OH (US); Steven D. Cech, Aurora, OH (US)

(73) Assignee: Pressco Technology Inc., Cleveland, OH (US)

( * ) Notice: Subject to any disclaimer, the term of this patent is extended or adjusted under 35 U.S.C. 154(b) by 251 days.

(21) Appl. No.: 10/753,014

(22) Filed: Jan. 7, 2004

(65) Prior Publication Data

US 2005/0146065 A1  Jul. 7, 2005

(51) Int. Cl.
*B29C 49/64*  (2006.01)
*B29C 49/78*  (2006.01)

(52) U.S. Cl. ............... 264/410; 264/458; 264/535; 264/40.6; 425/143; 425/174.4; 425/526

(58) Field of Classification Search ............... 425/143, 425/174.4, 526, 535; 264/410, 458, 40.6, 264/535; 250/339.03, 339.04; 356/216; 374/121, 132
See application file for complete search history.

(56) References Cited

U.S. PATENT DOCUMENTS 3,865,912 A * 2/1975 Rosenkranz et al. ....... 264/40.6
4,079,104 A    3/1978 Dickson et al.
4,396,816 A * 8/1983 Krishnakumar et al. .... 219/770
5,066,222 A   11/1991 Roos et al.
5,322,651 A    6/1994 Emmer
5,607,706 A    3/1997 Ingram

FOREIGN PATENT DOCUMENTS

WO    WO 02095382 A1 * 11/2002
WO    WO 03060447 A1 *  7/2003

OTHER PUBLICATIONS

Tidrow, M.Z., Device Physics and State-of-the-Art of Quantum Well Infrared Photodetectors and Arrays, Materials Science and Engineering B, vol. 74, Issues 1-3, pp. 45-51, May 1, 2000.*
Johnson, D., Measuring the Hot, Difficult, and Inaccessible, Control Engineering, Jun. 1, 2001, see the entire article.*
IEN-Europe, Jun. 1, 2003, Going Infrared with Handheld Temperature Measurement Handheld infrared thermometers provide safe, non-destructive temperature measurements of delicate, hot, moving and hard-to-reach targets.*

* cited by examiner

*Primary Examiner*—Robert B. Davis
(74) *Attorney, Agent, or Firm*—Fay Sharpe LLP

(57) ABSTRACT

A stretch blow molding system that condition preforms such that the temperature distribution within the cross-section of each preform is optimized prior to blow molding operations is provided. The system has a temperature measurement and control system capable of directly monitoring both the outside as well as inside surface temperature of preforms at different stages of transport throughout the thermal conditioning section of the system.

23 Claims, 5 Drawing Sheets

METHOD AND APPARATUS FOR THE MEASUREMENT AND CONTROL OF BOTH THE INSIDE AND OUTSIDE SURFACE TEMPERATURE OF THERMOPLASTIC PREFORMS DURING STRETCH BLOW MOLDING OPERATIONS

BACKGROUND OF THE INVENTION

This invention is directed to blow molding systems. More specifically, it is directed to stretch blow molding systems that condition preforms such that the temperature distribution within the cross-section of each preform is optimized prior to blow molding operations.

By way of background, one of the most critical process variables when attempting to stretch blow mold certain materials is the temperature distribution of the preform as it is being blown. This variable often has a significant impact on the most important physical properties of the final blown article. Ideally, the preform wall cross-sectional temperature distribution should be optimized for blow molding operations. In addition, it is advantageous within an automated blow molding process if preforms that are moving through the system are consistent in temperature profile, one preform to the next. In more specific terms, it is advantageous for both the inside and outside surface temperature of the preforms to be equal to each other and at the preferred blow molding temperature of the material.

The following collection of U.S. patents, all of which are incorporated herein by this reference, describe the current state-of-the-art associated with the thermal conditioning of preform blanks prior to automated blow molding operations:

U.S. Pat. No. 4,079,104
U.S. Pat. No. 5,066,222
U.S. Pat. No. 5,322,651
U.S. Pat. No. 5,607,706

These patents collectively teach the following: 1) the use of infrared radiation to raise the temperature of a series of dynamically conveyed preforms to a transition temperature wherein blow molding operations are enabled and optimized, 2) the qualitative time-varying temperature behavior of both the outside as well as the inside of a preform when it is subjected to infrared radiation from the outside of the preform, 3) the benefit of using forced air cooling on the outside of the preform to enable the inside preform surface temperature to "catch-up" with the outside temperature, 4) the benefit of thermally pre-conditioning preform blanks prior to the infrared radiation re-heat cycle to compensate for preform-to-preform ambient thermal differences, 5) the practice of using pyrometers to provide some degree of average outside surface temperature information for the purpose of process control, and 6) the benefit of rotating the preforms on their axis as infrared radiation is applied to more uniformly deliver thermal energy prior to blow molding operations.

However, there is a need in the field to accurately determine and control both the outside and inside surface temperature of preforms as such items enter the blow molding operation. The state-of-the-art implementations, as described in, for example, the noted patents, are limited to providing an averaged automated process control measurement on the outside surface temperature of the preform, exclusively. Process information related to critical control parameters (e.g., inside and outside preform temperature) has been limited in scope due to existing limitations in infrared temperature measurement technology and methodology.

For example, in existing state-of-the-art implementations, the outside surface temperatures of preforms are measured using a pyrometer. Pyrometers are well known in the art and can perform accurate quantitative temperature measurements of objects placed within their field of view (FOV). A significant limitation of pyrometers, though, is that their response time is relatively slow. To obtain an accurate temperature measurement using a pyrometer, the object under test needs to remain in the pyrometer's field of view (FOV) for a period of time ranging from hundreds of milliseconds to seconds. In a dynamic blow molding system, the rate at which preforms are transported through the system does not allow for the accurate temperature measurement of any one preform using a pyrometer. Rather, state-of-the-art implementations use pyrometers to obtain an average surface temperature of the last several preforms passed through the system. One limitation of this sampling scheme is that significant preform to preform temperature variations, if present, are averaged out and go undetected by the process control apparatus deployed in prior art machines.

At the speeds at which preforms are transported through existing state-of-the-art machines, temperature measurement must be made within a couple of milliseconds—before the part moves out of the sensing device's field of view (FOV). This time period is much too short to allow pyrometers to make an accurate temperature measurement. Direct contact methods for measuring temperatures, such as thermocouples, are impractical because of speed limitations and because such devices may cause damage to the hot pliable preform. If such damage occurred, it would undesirably render the process a high maintenance endeavor.

An additional and perhaps more severe limitation related to the slow response time of pyrometers is that that there has been no direct practical manner discovered by which a reasonable and accurate measurement of the inside surface temperature of moving preforms can be obtained using these devices. The inside surface temperature of a preform 10 can only be directly measured through the open end of the preform. Indirect methods, using complex thermal conduction equations and multiple, time spaced pyrometers, have been theorized but have not been implemented into factory production systems. The difficulty of implementing, maintaining, and calibrating such systems is a serious drawback. Further, such systems only predict from indirect measurements—which allows uncontrolled environmental and other variables to adversely affect the temperature estimates and create inaccuracy and mistrust of such estimates.

The present invention, however, overcomes these difficulties and others.

SUMMARY OF THE INVENTION

An object of this invention is to provide a blow molding system with a temperature measurement and control system capable of directly monitoring the outside surface temperature and/or the inside surface temperature of preforms at different stages of transport throughout the thermal conditioning portion of the system.

Another object of this invention is to use these inside and/or outside surface temperature measurements in an automated manner to control both heating elements and cooling control elements of the blow forming machine in order to optimize the temperature profile along the long axis of the preforms and, thus, the overall manufacturing operation.

Another object of this invention is to provide a blow molding system with a temperature measurement and control system capable of making measurements on individual preforms as they dynamically move towards the blow molding operation, eliminating the need to make control decisions based on average preform temperature measurements.

Yet another object of this invention is to provide dynamic surface temperature measurements on discrete parts to an accuracy of ≦1 degree Celsius.

Still another object of this invention is to provide a technique for measuring specific sub-portions or regions of selected individual preforms to provide for the correct heat profile.

Another aspect of this invention is to provide a way of correlating or linking the specific heat measurements to subsequent quality or process measurements after blowing to best optimize the stretch blow molding process or energy consumption efficiency.

Another aspect of this invention is to directly relate specific machine components such as molds, spindles, and lamps to specific thermal data and profiles to minimize maintenance time and to optimize manufacturing system performance.

In one embodiment of the invention, a system according to the invention comprises a conveyance means operative to transport a series of preforms through a thermal conditioning section of a stretch blow molding machine, at least one high speed, snapshot action thermal infrared temperature sensor deployed in position to acquire at least one of an outside surface temperature measurement of a preform and an inside surface temperature measurement of a preform and an infrared processing and control subsystem used to monitor temperature data supplied by the infrared temperature sensors and, in response, generate a control signal to be sent to the thermal conditioning section.

In another embodiment of the invention, a method comprises transporting a series of preforms through a thermal conditioning section of a blow molding machine, configuring at least one high-speed, snapshot action thermal infrared temperature sensor such that at least one of an outside surface temperature of the preform and an inside surface temperature of the preform can be measured during its transport, acquiring at least one of outside and inside surface temperature measurements of each individual preform transported through the blow molding machine, monitoring a status of an infrared radiation subsystem and an outside surface cooling subsystem of the blow molding machine, generating a thermal control signal in response to the outside or inside surface temperature measurements and thermal control subsystem status data and communicating this thermal control signal to at least one of the infrared radiation subsystem and the outside surface cooling subsystem to enact closed loop control of a temperature profile of the transported preforms.

In another embodiment of the present invention, a sensor apparatus comprises a sensor element operative to selectively detect thermal energy emitted by a specimen to determine a surface temperature of the specimen, a cooling element associated with the sensor element, an element positioned to define a field of view between the sensor element and the specimen and a means for selectively enabling and disabling the field of view.

DETAILED DESCRIPTION OF THE INVENTION

An objective of this invention is to provide a blow molding system having an improved thermal conditioning section with improved temperature measurement and control features. The temperature measurement and control features enable the system to directly monitor one or both of the outside and inside surface temperatures of preforms at different stages of transport throughout the thermal conditioning section of the system. That is, the present invention implements a methodology for the direct and precise measurement of individual preforms and selected sub-portions thereof. This advancement in the art was not heretofore known and provides significant advantages in the blow molding field.

Figure 1A:
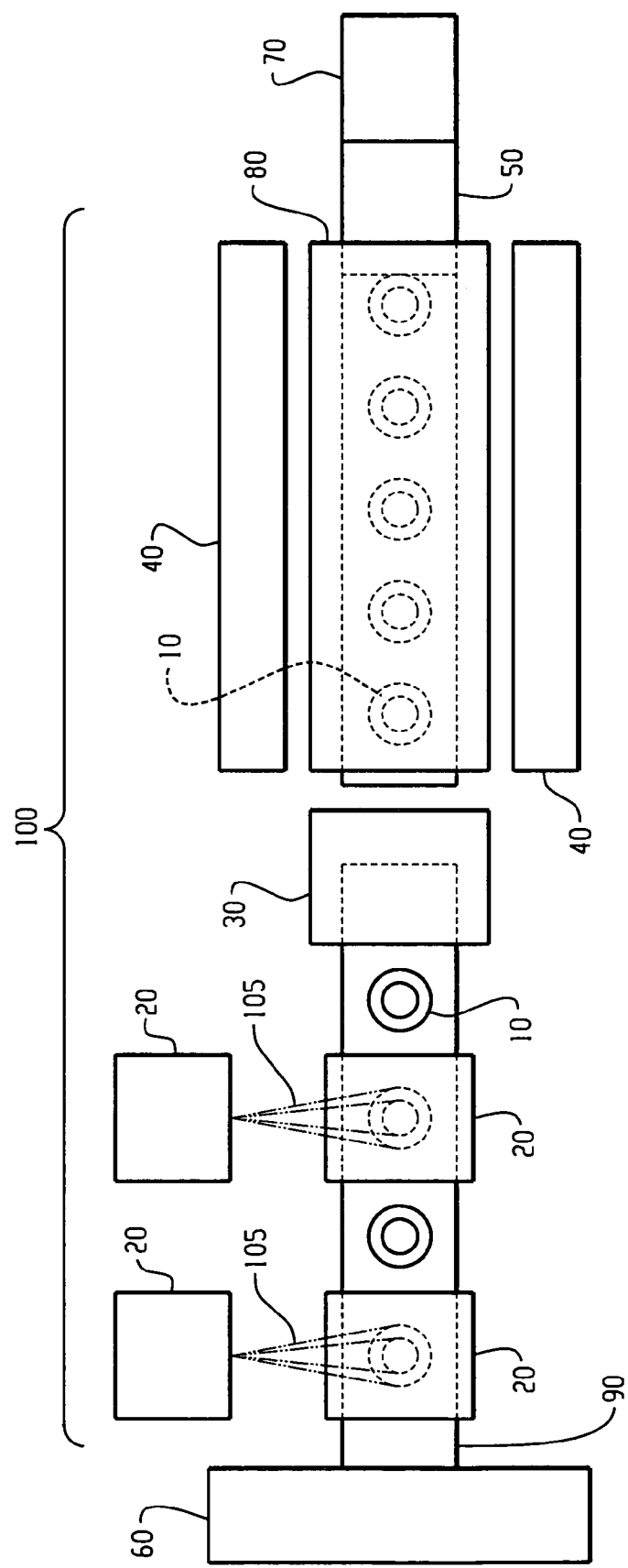
FIGS. 1(a) and 1(b) are diagrams illustrating an embodiment of the present invention.

Referring to FIGS. 1(a) and (b), the components of a thermal conditioning section 100 include high-speed infrared temperature sensors 20 and an infrared temperature processing and control subsystem 30. The infrared temperature processing and control subsystem 30 interfaces directly with the infrared radiation subsystem 40 and the outside surface cooling subsystem 50 that are contained within existing prior art implementations.

The system according to the invention is configured to facilitate closed-loop control of the manufacturing operations. In this regard, the system is capable of directly monitoring the outside surface temperature, as well as inside surface temperature, of preforms at different stages of transport throughout the thermal conditioning portion of the system. Of course, it should be understood that measurement of only the outside surface temperature or only the inside surface temperature of a preform using the present invention may be advantageous in some circumstances. As such, the invention is not limited to detecting both inside surface temperatures and outside surface temperatures but may also be deployed to detect one or the other. The inside and/or outside temperature measurements are used in an automated manner to control both heating elements and cooling control elements of the blow forming machine in order to optimize the temperature profile along the long axis of the preforms and, thus, the overall manufacturing operation. For example, the system preferably has the capability to directly relate specific machine components such as spindles and/or lamps to specific thermal data and profiles to minimize maintenance time and to optimize manufacturing system performance. Moreover, the system provides a way of correlating or linking the specific heat measurements to subsequent quality or process measurements after blowing to best optimize the stretch blow molding process or energy consumption efficiency.

In operation, preforms 10 enter into the thermal conditioning section 100 of the blow molding system by way of the preform infeed mechanism 70. These feed mechanisms are conventional in the art. Once inserted into the system, preforms 10 are transported via a conveyance device 80 through a region of the thermal conditioning section 100 wherein infrared radiation is applied to the preforms 10 by way of the infrared radiation assembly(ies) 40. Infrared radiation is added at this stage for the purpose of raising the temperature of the preforms 10 to a temperature that is preferred for blow molding operations. The conveyance device 80 and infrared assemblies 40 preferably take forms that are well known in the industry. For example, the infrared assemblies 40 may take the form of banks of quartz infrared lamps having different heights. At the same time, the outside surface temperature is lowered by way of the surface cooling mechanism 50. The surface cooling mechanism 50 is typically implemented as a forced air convection cooler, e.g. fans.

Figure 1B:
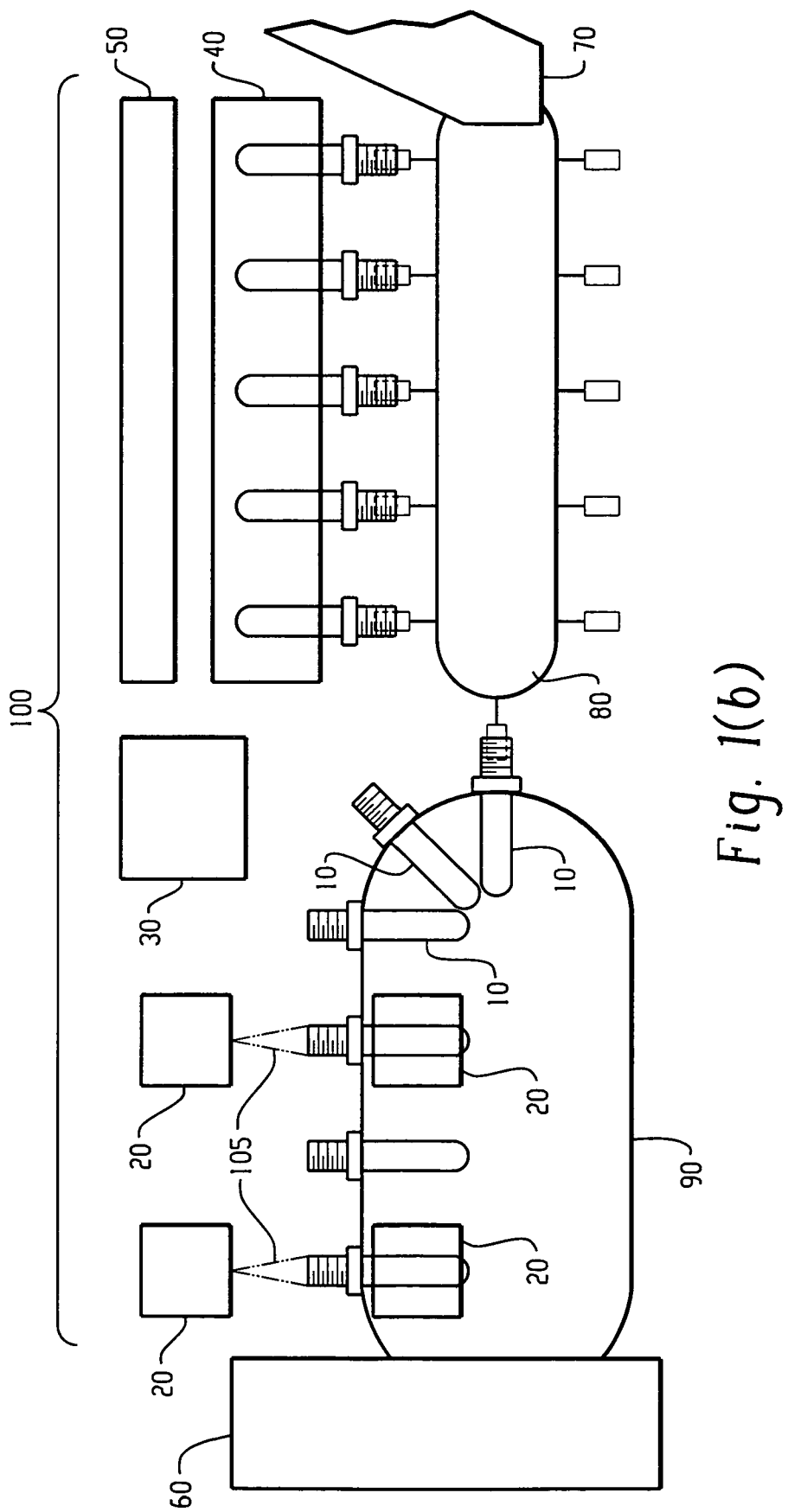

After being heated to a preferred temperature, the preforms 10 are transported via a conveyance device 90 through a passive zone on the way to the blow molding section 60. FIGS. 1(a) and (b) show several high-speed infrared temperature sensors 20 deployed within this passive zone so as to sample both the outside and inside surface temperature of each preform as it approaches the blow molding section 60. Snapshot temperature measurements are preferably made when the preforms 10 are within the field-of-view (FOV) 105 of an individual sensor 20. Using the high-speed infrared temperature sensors 20 of this invention, the outside surface temperature of the preforms 10 are measured by directing the field of view (FOV) 105 of a sensor 20 onto the outside cylindrical surface of the preforms 10 (as in FIG. 1(a)). Likewise, the inside surface temperature of the preforms 10 can by measured by directing the field of view (FOV) 105 of a sensor 20 into the preform opening (as in FIG. 1(b)).

In FIGS. 1(a) and (b), a total of 4 sensors 20 are depicted (two deployed to measure the outside surface temperature and two deployed to measure the inside surface temperature). As shown, the sensors 20 are deployed after thermal energy has been added to the preforms 10. The sensors may also be deployed to detect temperatures at different times during the thermal conditioning phase of the stretch blow molding process. Of course, the invention also extends to embodiments deploying any number of the sensors 20 (one or greater) within the thermal conditioning section of the process in a variety of forms and configurations. For example, a plurality of sensors may be disposed in a bank. This also includes placing sensors 20 at the preform infeed section 70 or any other location prior to the blow molding section 60. The sensors may also be strategically placed so as to be operative to sense surface temperature of a selected portion or portions (or sub-portions or regions) of a preform (at different positions along its length, for example) to, for example, provide for a correct heat profile, as will be described. Moreover, the sensors preferably provide dynamic surface temperature measurements on discrete parts to an accuracy of $\leq 1$ degree Celsius.

One aspect of this invention is the nature and construction of the high-speed infrared temperature sensors 20. The high-speed infrared temperature sensors 20 described by this invention are deployed using high-speed lead salt or Indium Gallium Arsenide (InGaAs) infrared detectors as the photosensitive element. Certain types of lead salt compounds (lead selenide (PbSe) and lead sulfide (PbS) in particular) and InGaAs are adequately sensitive to radiation emitted by objects in the temperature range of 40 degrees Celsius (° C.) to 150 degrees Celsius (° C.). The response times of these devices are also fast enough to allow high-speed temperature measurement sampling through the opening of a rapidly transported preform 10. The sensors perform in a variety of modes. For example, the sensors may perform in a snapshot action mode. Suitably designed and implemented as described in this disclosure, high-speed infrared temperature sensors 20 enable the implementation of an improved measurement and control system for thermoplastic blow molders.

Figure 2A:
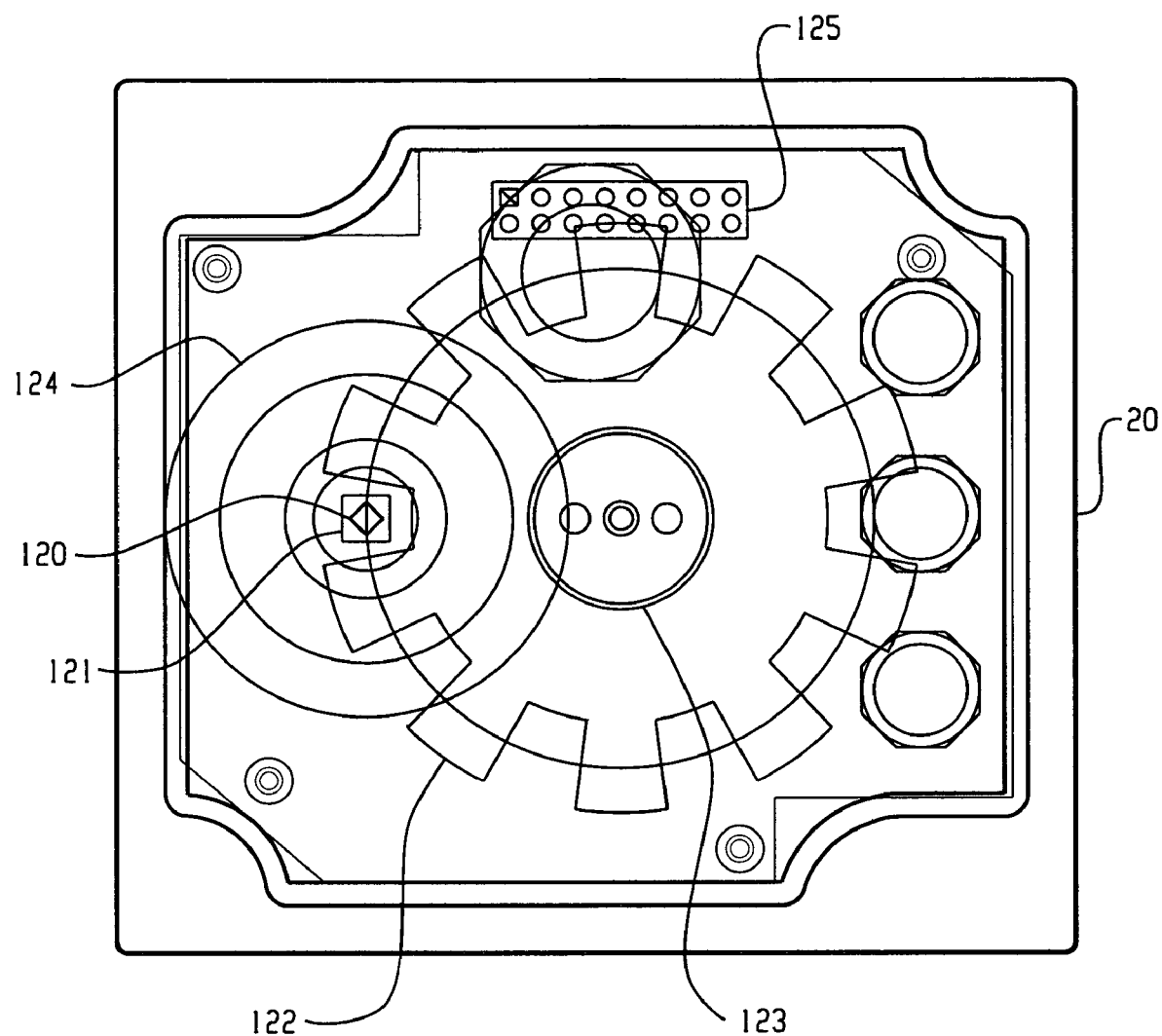
FIGS. 2(a) and 2(b) illustrate a sensor according to the present invention; and, FIG. 3 is a flow chart illustrating a method according to the present invention.
Figure 2B:
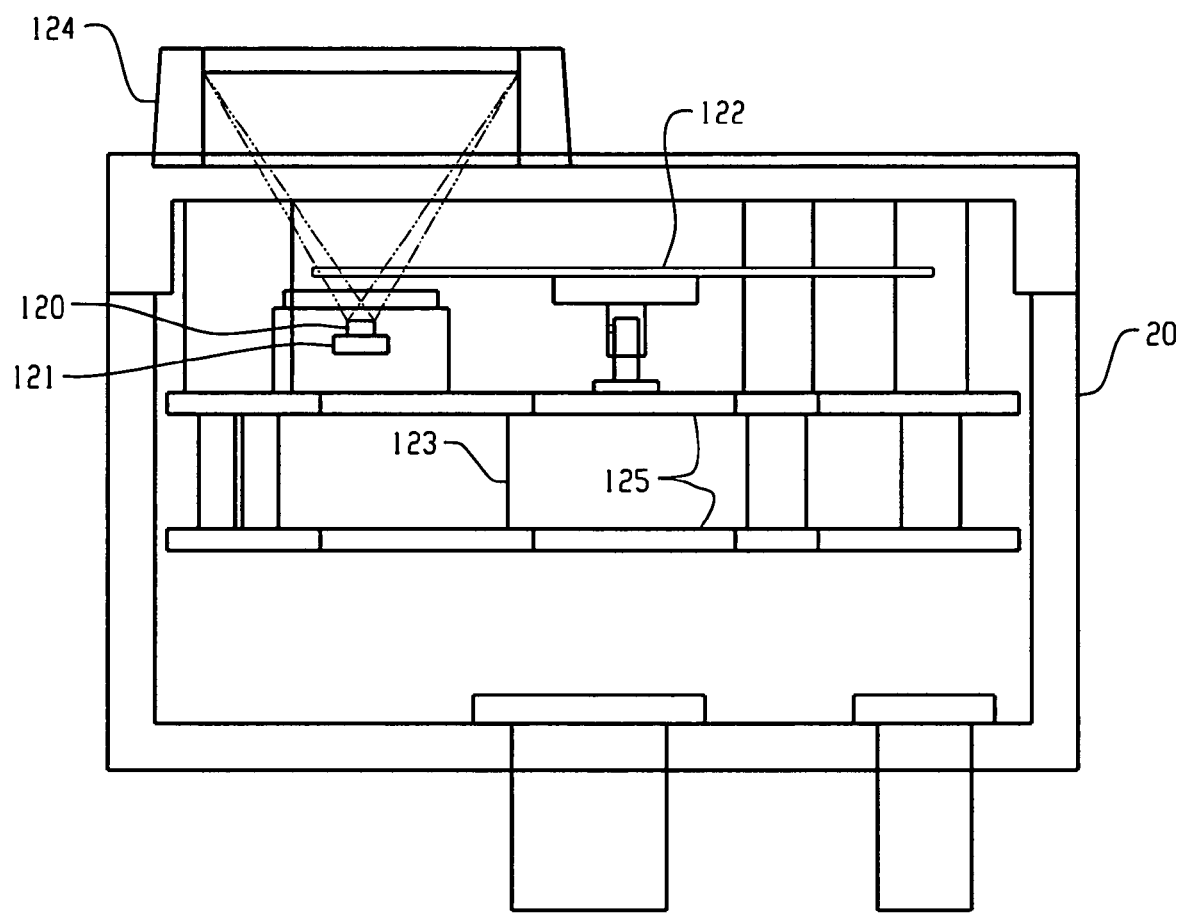

More particularly, one preferred implementation of the high-speed temperature sensors 20 defined by this invention is illustrated in FIGS. 2(a) and 2(b). A high-speed infrared detector element 120 is used as the photosensitive element. As noted above, the detector may be formed from any of a variety of suitable materials, including indium gallium arsenide (InGaAs), lead selenide (PbSe), and lead sulfide (PbS). In the preferred embodiment, however, the detector element 120 is constructed using a PbSe detector.

Situated in direct contact with the high-speed infrared detector element 120 is a thermal-electric (TE) cooler element 121. Solid-state TE-cooler elements are well known in the art. By allowing an electrical current to flow through the individual solid-state cells of a TE-cooler, TE-cooler elements exhibit the behavior of transferring thermal energy from one side of its structure to the other. Using TE-cooler elements, it is possible to both heat or cool an object placed in contact with one side of the TE-cooler simply by passing an appropriate electrical signal through the cooler. The fact that the measurement sensitivity parameter of thermal infrared detectors is directly related to their operational temperature is well known in the art of infrared sensing. In order for the high-speed infrared detector element 120 to acquire stable, quantifiable temperature measurements its operating temperature needs to be controlled within tight limits. In the preferred implementation, the TE-cooler element 121 is used to stabilize the operating temperature of the high-speed infrared detector element 120 within a tight operational window centered around 10 degrees Celsius (° C.).

Another aspect of the high-speed infrared temperature sensors 20 is the use of a chopper wheel 122 and associated chopper motor 123. It is well known in the art of infrared sensing that the process of chopping the sensor input signal increases the resultant signal-to-noise ratio (SNR) of the infrared measurements. In this context, the term chopping refers to the process of alternately enabling and disabling a direct optical path from the scene of interest to the infrared detector element 120. There are various means known in the art to enact such a behavior. In the preferred embodiment, the advantageous chopping process is enabled using a mechanical chopper wheel 122 driven by an associated chopper motor 123. By chopping the infrared input to the high-speed infrared detector 120 at a controlled frequency, it is possible to filter out large low-frequency and DC signals that result from thermal radiation emitted by support and packaging entities located in close proximity to the infrared detector element 120 (detector housing, detector window, etc.). Chopping the input signal also allows DC signals associated with detector bias voltages and currents to be effectively filtered out.

It is typical within state-of-the-art of infrared sensors to chop the input signal at rates ranging from 10 to perhaps 200 Hertz (Hz). These types of chop frequencies can easily be achieved using existing chopper wheel or tuning fork-type mechanical assemblies. While the act of chopping the input signal at these rates is adequate for taking measurements of static or slowly moving parts, a signal chop rate one or two orders of magnitude higher in frequency is required in order to ensure the acquisition of surface temperature measurements of rapidly moving manufactured parts, such as preforms 10 moving through the thermal conditioning section 100 of a stretch blow molding system. Running asynchronously to the movement of any individual preform 10, it is possible to conceive of a situation wherein a slowly rotating chopper wheel 122 could be in a closed or blocked position during the entire time frame wherein it is within the field of view (FOV) 105 of the high-speed infrared temperature sensor 20. By increasing the speed of the chopper wheel 122, it is possible to reach a condition wherein, within some acceptable range of positioning uncertainty, the chopper wheel 122 always reaches an open or unblocked condition during the time period a preform 10 is within the field of view (FOV) 105 of the high-speed infrared temperature sensor 20. In the preferred embodiment of this invention, a chop frequency within the range of 1 to 5 kilohertz (KHz) is preferred. Implementing the high-speed infrared temperature sensors 20 using high-speed brushless DC motors for the chopper motor 123 and multi-cycle chopper wheels for the chopper wheel 122, it is possible to achieve these preferred chop rates and, thus, achieve what can be described as a snapshot action temperature measurement mode of operation. It should be clear to anyone skilled in the art that the high-speed infrared detector element 120 could be implemented as a multiple element area or liner detector array. Implemented in this fashion, the high-speed infrared temperature sensor 20 would operate as a snapshot action thermal infrared camera.

In the preferred embodiment of the high-speed infrared temperature sensor 20, a lens element 124 is used to limit its field of view (FOV) 105 to a well-defined region. Preferably, this lens element is implemented as a Fresnel-type lens. These types of imaging components are well known in the field of infrared sensing. Alternately, it could be implemented using either refractive or reflective optical components.

By designing the optics to have a particular field of view appropriate for any specific application of the high-speed infrared temperature sensor system it is possible to perform very high-speed measurement of many different kinds of fast moving items of different size, shape, and distance. In the preferred embodiment for a specific application, it is often desirous to measure a specific sub-region of an item which may require the use of optical techniques, which are well known in the art, in order to facilitate guiding the electromagnetic energy properly into the sensor 20.

For example, the sensors may be implemented to check the preform 10 in a substantial number of zones along its length to verify the specific temperatures in each zone. This may be accomplished using various focusing and positioning techniques known to those in the optics and/or machine vision field. By so measuring, it is possible to close the loop to the infrared radiation subsystem 40 and/or convective blowers 50 far more precisely than existing systems. It should be understood that this may be accomplished for both the inside and outside surfaces. It should be further understood that while multiple pyrometers may be implemented to obtain average temperatures at different positions along the length of the preform, the present invention allows for more precise measurement of individual preforms or sub-portions and represents a marked improvement over any such averaging. Moreover, it should be appreciated that the system allows for the measurement of sub-portions of the preform, either inside or outside, as may be most advantageous.

If the application requires multiple measurement points or sub-regions measurements in proximity to one another, it may require the positioning of multiple detector elements inside one sensor 120. This embodiment can be implemented such that the detector elements utilize a common chopper or multiple parallel choppers depending on physical size and practicality constraints consistent with the application needs.

Also included as part of the high-speed infrared temperature sensor 20 are sensor control and processing circuit boards 125. This board or board-set 125 is used to perform functions including, but not limited to, detector signal processing, motor speed control, analog-to-digital conversion, closed-loop TE-cooler control, and data receipt and transmission.

By modulating the embodiment as described herein, it is possible to make high-speed temperature measurements that have not been possible with previously available systems. While the present invention is described in connection with injection molded polyethylene terephthalate (PET) preforms, it should be readily apparent that the invention can be applied to a substantial range of other high-speed applications which historically have been too fast to be properly and accurately measured with location specific high-speed temperature snapshots.

In the preferred embodiment of this invention, the infrared temperature processing and control subsystem 30 is implemented as a highly intelligent, multi-function microprocessor-based computer with data display and logging functions. In this format, the infrared temperature processing and control subsystem 30 receives, or monitors, surface temperature signals from the infrared temperature sensors 20. In response to these input signals, it generates (through, for example, various hardware and software techniques based on a desired thermal profile that may be stored in the subsystem 30) appropriate control signals that are issued to the infrared radiation subsystem 40, as well as the outside surface cooling subsystem 50. The control signals will facilitate a variety of functions to be performed by the subsystems 40 and 50. For example, the control signals may direct the infrared radiation subsystem 40 to increase its energy level or decrease its energy level. Likewise, the control signals may serve as a similar command structure for the cooling subsystem. Of course, the subsystem 30 also preferably monitors the status (e.g., energy levels) of the subsystems 40 and 50 so that the control signals can be generated to be effective for the process. In addition to these functions, the preferred embodiment of the infrared temperature processing and control subsystem 30 also monitors the temperature data provided by the sensors over specified time periods so as to provide data display and logging functions related to the surface temperature measurements made by the infrared temperature sensors 20.

Alternately, the infrared temperature processing and control subsystem 30 could be implemented as an industrial programmable logic controller (PLC). Implemented in this fashion, the data logging and display of temperature information would be omitted. The infrared temperature processing and control subsystem 30 would function in a minimal fashion, receiving temperature signals from the infrared temperature sensors 20 and providing control signals to the infrared radiation subsystem 40 and the outside surface cooling subsystem 50.

Figure 3:
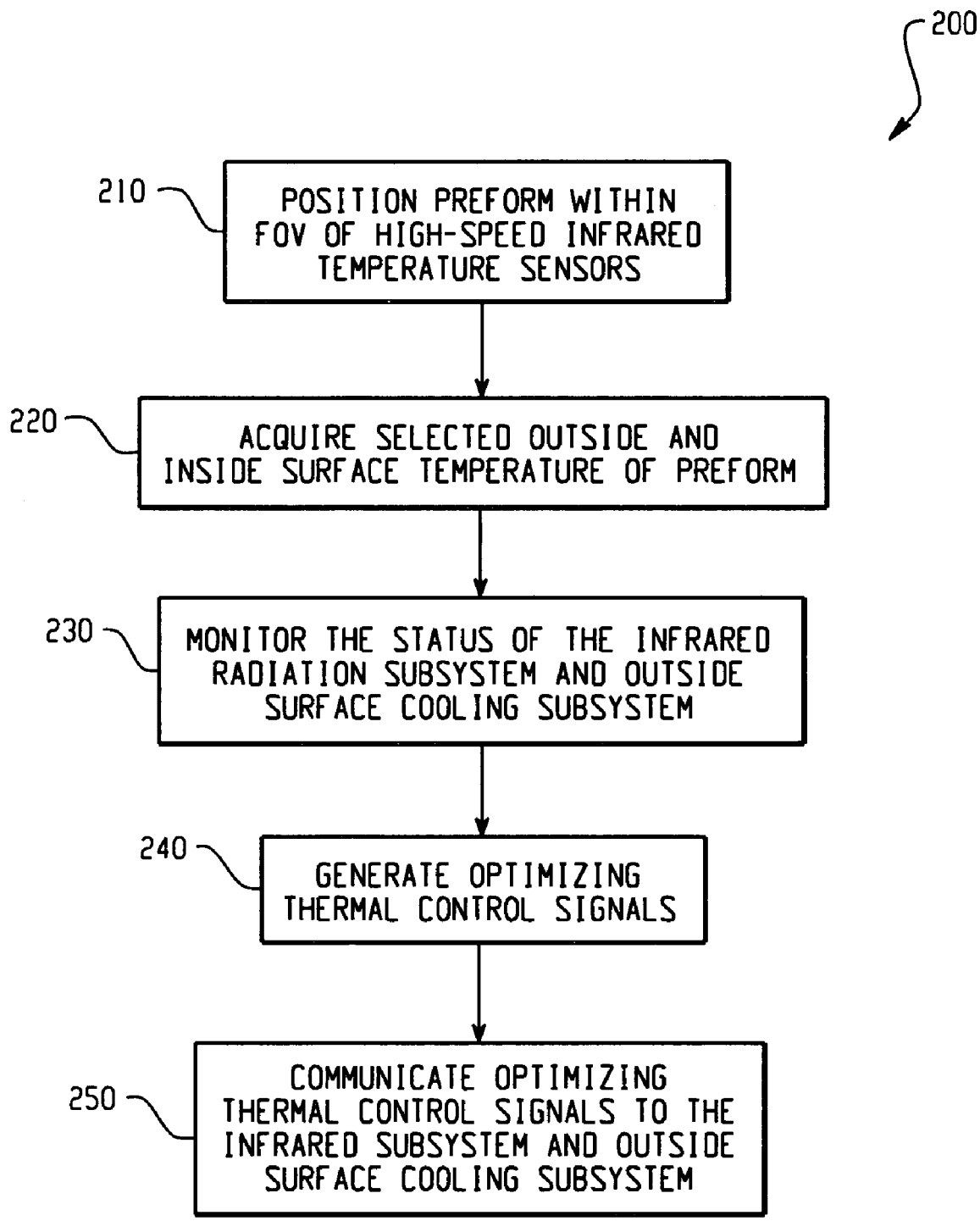

Referring now to FIG. 3, the preferred temperature measurement and control method 200 reflecting the basic steps of operation is shown. Preforms 10 are transported via a conveyance means 90 through a passive zone of the thermal conditioning section 100 of a blow molding system. At some instant in time, the preforms 10 pass through the respective fields of view (FOVs) 105 of the various infrared temperature sensors 20 (step 210). At the instant the preforms 10 are within the field of view (FOV) 105 of an individual sensor 20, the surface temperature(s) of the preforms 10 are measured. Various sensors 20 are properly deployed and positioned to acquire at least one of an outside and an inside surface temperature measurement (step 220). Coincident to the real-time temperature measurements being made on individual preforms 10 passing through the blow molding system, the operational status of the infrared radiation subsystem 40 and outside surface cooling subsystem 50 are monitored (step 230). Algorithms are then applied by the subsystem 30 that reduce the outside and/or inside surface temperature and subsystem status data into appropriate control signals which will optimize the thermal profile of the preforms 10 prior to stretch blow-forming operations (step 240). These control signals are then communicated to the infrared radiation subsystem 40 and outside surface cooling subsystem 50 to enact optimized, closed-loop control of the preform 10 thermal profile (step 250). As noted above, for example, the system preferably has the capability to directly relate specific machine components such as spindles and/or lamps to specific thermal data and profiles to minimize maintenance time and to optimize manufacturing system performance.

The above description merely provides a disclosure of particular embodiments of the invention and is not intended for the purpose of limiting the same thereto. As such, the invention is not limited to only the above-described embodiments. Rather, it is recognized that one skilled in the art could conceive alternative embodiments that fall within the scope of the invention.

What is claimed is:

1. A system for providing the measurement and control of one or both of the inside and outside surface temperature of thermoplastic preforms during stretch blow molding operations of a stretch blow molding machine, the stretch blow molding machine having a thermal conditioning section, the system comprising:
   a conveyance means operative to transport a series of preforms through the thermal conditioning section of the stretch blow molding machine;
   at least one high-speed, snap-shot action thermal infrared temperature sensor deployed and positioned to acquire at least one of an outside surface temperature measurement of a preform and an inside surface temperature measurement of a preform; and,
   an infrared processing and control subsystem used to monitor temperature data supplied by the infrared temperature sensors and, in response, generate a control signal that is then sent to the thermal conditioning section.

2. The system as set forth in claim 1 wherein the high-speed snap-shot shot action thermal infrared temperature sensors are implemented using lead salt detectors.

3. The system as set forth in claim 2 wherein the detectors are lead selenide (PbSe) detectors.

4. The system as set forth in claim 2 wherein the detectors are lead sulfide (PBS) detectors.

5. The system as set forth in claim 1 wherein the high-speed, snap-shot action thermal infrared temperature sensors are implemented using lnGaAs detectors.

6. The system as set forth in claim 1 wherein the infrared processing and control subsystem is implemented as a multi-function computer with data display and logging functions.

7. The system as set forth in claim 1 wherein the infrared processing and control subsystem is implemented as an industrial PLC.

8. The system as set forth in claim 1 wherein two or more outside surface temperature sensors and two or more inside surface temperature sensors are deployed to acquire temperature information at different times during a thermal conditioning phase of the stretch blow molding operation.

9. The system as set forth in claim 1 wherein a bank of two or more outside surface temperature sensors are deployed to simultaneously acquire the outside surface temperature of the preform at different positions along its length.

10. The system as set forth in claim 1 wherein a plurality of inside surface temperature sensors are deployed to simultaneously acquire the inside surface temperature of the preform at different positions along its length.

11. The system as set forth in claim 1 wherein two or more banks of outside surface temperature sensors and two or more inside surface temperature measurement sensors are deployed to acquire temperature information at different times during a thermal conditioning phase of the stretch blow molding operation.

12. The system as set forth in claim 1 wherein the high-speed snap-shot action thermal infrared temperature sensors are implemented as thermal infrared cameras.

13. A method of preform temperature profile measurement and control within a stretch blow molding system, the method comprising the steps of:
   transporting a series of preforms through a thermal conditioning section of a blow molding machine;
   configuring at least one high-speed, snap-shot action thermal infrared temperature sensor such that at least one of an outside surface temperature of the preform and an inside surface temperature of the preform can be measured during its transport;
   acquiring at least one of outside and inside surface temperature measurements of individual preforms transported through the blow molding machine;
   monitoring a status of at least one of a heating subsystem and an outside surface cooling subsystem of the blow molding machine;
   generating a thermal control signal in response to the outside or inside surface temperature measurements and thermal control subsystem status data; and,
   communicating this thermal control signal to at least one of the heating subsystem and the outside surface cooling subsystem to enact closed-loop control of a temperature profile of the transported preforms.

14. The method as set forth in claim 13 wherein the acquiring of the inside surface temperature comprises measuring the inside surface temperature of a selected sub-portion of the preform.

15. The method as set forth in claim 13 wherein the acquiring of the outside surface temperature comprises measuring the outside surface temperature of a selected sub-portion of the preform.

16. The method as set forth in claim 13 wherein the acquiring occurs at different times during a stretch blow molding process.

17. The method as set forth in claim 13 wherein the acquiring occurs at different positions along a length of the preform.

18. The method as set forth in claim 13 further comprising the step of correlating individual preform temperature measurement data to specific machine components including spindles or lamps.

19. The method as set forth in claim 13 further comprising the step of correlating individual preform temperature measurement to subsequent container quality measurements.

20. The method as set forth in claim 13 wherein at least one of outside and inside surface temperature measurements of each individual preform transported through the blow molding machine is acquired.

21. The method as set forth in claim 13 wherein the heating subsystem is an infrared radiation subsystem.

22. The method as set forth in claim 13 wherein temperature measurements of individual preforms are correlated to specific heating signals tailored to correct heat in respective individual preforms.

23. The method as set forth in claim 13 wherein temperature measurements of individual preforms are correlated to specific heating signals tailored to correct the heat in respective groups of preforms.

* * * * *